United States Patent
Mitani

(10) Patent No.: US 6,754,547 B1
(45) Date of Patent: Jun. 22, 2004

(54) DATA REPRODUCTION CIRCUIT AND VOICE RECORDING REPRODUCTION APPARATUS COMPRISING THE CIRCUIT

(75) Inventor: Tadahiro Mitani, Matsubara (JP)

(73) Assignees: Sanyo Electric Co., Ltd., Moriguchi (JP); Sanyo Technosound Co., Ltd., Daito (JP)

(*) Notice: Subject to any disclaimer, the term of this patent is extended or adjusted under 35 U.S.C. 154(b) by 792 days.

(21) Appl. No.: 09/614,254

(22) Filed: Jul. 12, 2000

(30) Foreign Application Priority Data

Jul. 14, 1999 (JP) .......................................... 11-200570

(51) Int. Cl.[7] .............................................. G06F 17/00
(52) U.S. Cl. ................... 700/94; 379/88.22; 379/88.28
(58) Field of Search ............................. 369/63, 31, 48; 704/270, 272; 360/32, 55; 381/61; 700/94; 348/14.06; 379/70, 88.04, 88.22, 73, 74, 76, 83, 67.1, 68, 88.28, 77

(56) References Cited

U.S. PATENT DOCUMENTS

| | | | | |
|---|---|---|---|---|
| 4,779,252 A | | 10/1988 | Custers et al. ................ | 369/32 |
| 5,081,672 A | * | 1/1992 | Mita et al. ..................... | 379/68 |
| 5,197,052 A | | 3/1993 | Schroder et al. .............. | 369/25 |
| 5,892,814 A | * | 4/1999 | Brisebois et al. ........ | 379/88.24 |
| 5,949,852 A | * | 9/1999 | Duncan ..................... | 379/67.1 |
| 6,335,962 B1 | * | 1/2002 | Ali et al. ................. | 379/88.11 |
| 6,483,901 B1 | * | 11/2002 | Cuallo ..................... | 379/88.28 |

FOREIGN PATENT DOCUMENTS

| | | | | |
|---|---|---|---|---|
| EP | 0805455 | * | 5/1997 | ............ G11C/7/00 |
| EP | 0 805 455 A2 | | 11/1997 | |
| EP | 0 860 829 A2 | | 8/1998 | |
| EP | 0860829 | * | 8/1998 | ........... G11B/27/10 |
| JP | 07-262753 | | 10/1995 | |
| JP | 08-171723 | | 7/1996 | |
| JP | 09-044200 | * | 2/1997 | ............. G10L/9/18 |

OTHER PUBLICATIONS

European Search Report dated Jul. 27, 2001.

* cited by examiner

*Primary Examiner*—Duc Nguyen
*Assistant Examiner*—Lun-See Lao
(74) *Attorney, Agent, or Firm*—Armstrong, Kratz, Quintos, Hanson & Brooks, LLP

(57) ABSTRACT

A voice recording-reproduction apparatus including a microphone, speaker, voice recording-reproduction circuit, recording medium, key input device and control circuit. The circuit is adapted to prepare a plurality of folders on the recording medium and to perform a data reading and processing operation for predetermined one of the folders in each mode. When a reproduction key of the key input device is depressed and if no data is recorded in the folder to be used in the mode at the time of the depression, the control circuit checks whether or not data is recorded in one of the other folders. When one of the folders is found to have data recorded therein, the control circuit sets the voice recording-reproduction circuit in a mode in which the folder is to be used for data reading and processing, and gives a reproduction command to the circuit.

5 Claims, 3 Drawing Sheets

DATA REPRODUCTION CIRCUIT AND VOICE RECORDING REPRODUCTION APPARATUS COMPRISING THE CIRCUIT

FIELD OF THE INVENTION

1. Background of the Invention

The present invention relates to a data reproduction circuit for use with a recording medium having a plurality of folders prepared thereon for reproducing a series of data recorded in desired one of the folders, and a voice recording-reproduction apparatus having the circuit.

2. Description of the Related Art

Voice recording-reproduction apparatus are known in recent years which have a microphone and a speaker and which are adapted to prepare a plurality of folders on a smart medium or like recording medium, record the voice input from the microphone in desired one of the folders as digital voice data and read the voice data from the desired folder to output the data as voice from the speaker.

FIG. 3 shows the construction of an example of voice recording-reproduction apparatus having the functions described above.

The apparatus has a microphone 1 and a speaker 6 which are connected to a voice recording-reproduction circuit 3 via respective amplifiers 2, 5. Also connected to the circuit 3 is a recording medium 4 for recording voice signals input from the microphone 1 in the form of digital voice data.

The series of voice signals input from the microphone 1 is fed to and amplified by the amplifier 2, and then fed to the circuit 3, in which the signals are converted to digital voice data. The voice data is written to the medium 4.

On the other hand, the voice data recorded on the recording medium 4 is read by the circuit 3 and converted to analog voice signals, which are fed to and amplified by the amplifier 5 and thereafter delivered from the speaker 6 as voice.

Connected to the voice recording-reproduction circuit 3 is a control circuit 70 for controlling the operation of the circuit 3. The control circuit 70 has incorporated therein a memory (not shown) for storing mode specifying data for specifying the mode of the circuit 3 to be described later. Power is supplied to the circuit 70 at all times regardless of whether the power source of the apparatus main body is on or off.

A key input device 8 and an information display 9 are further connected to the control circuit 70.

The voice recording-reproduction circuit 3 is adapted to prepare four folders, e.g., folder 1, folder 2, folder 3 and folder 4, on the recording medium 4. The circuit 3 is selectively settable by a change-over in one of four modes, i.e., folder 1 mode wherein data is written to and read from folder 1, folder 2 mode wherein data is written to and read from folder 2, folder 3 mode wherein data is written to and read from folder 3, and folder 4 mode wherein data is written to and read from folder 4.

To operate the voice recording-reproduction apparatus, the user turns on the power source of the apparatus main body, then sets an unused new recording medium 4 in the apparatus main body, and thereafter manipulates a mode select key (not shown) on the key input device 8 to select, for example, the folder 1 mode, whereupon the control circuit 70 sets the voice recording-reproduction circuit 3 in the folder 1 mode, writes mode specifying data representing the folder 1 mode to the memory in the circuit 70 and thereafter gives a preparation command to the circuit 3. In response to the command, the circuit 3 prepares folder 1 on the medium 4. Similarly when the user selects the folder 2 mode, folder 3 mode and folder 4 mode, the circuit 3 prepares folder 2, folder 3 and folder 4 on the medium 4.

Subsequently when the user is to record a sequence of voice data, for example, in folder 1, the user selects the folder 1 mode by manipulating the mode select key on the key input device 8 and then depresses a recording start key (not shown) on the key input device 8. When this procedure is performed, the control circuit 70 sets the voice recording-reproduction circuit 3 in the folder 1 mode, rewrites the mode specifying data in the memory in the circuit 70 to mode specifying data representing the folder 1 mode, and thereafter gives a recording command to the circuit 3. In response to the command, the circuit 3 converts the voice signals delivered from the amplifier 2 to digital voice data and thereafter records the data in folder 1 on the recording medium 4.

In this way, the user can record the series of voice signals input from the microphone 1 in the desired folder among folders 1 to 4 as digital voice data.

The voice recording-reproduction apparatus is further adapted to perform a preferential reading procedure. When the user depresses a reproduction key (not shown) with the power source of the apparatus main body turned off, the control circuit 70 turns on the power source of the main body, thereafter recognizes the mode of the voice recording-reproduction circuit 3 currently set, namely, the mode set immediately before the power source is turned off, with reference to the mode specifying data written to the circuit memory and checks whether voice data is recorded in the folder which is to be used for writing and reading in this mode (hereinafter referred to as the "folder to be used"). When the check result indicates the presence of voice data, the control circuit 70 gives a reproduction command to the circuit 3. In response to the command, the circuit 3 reads the voice data from the folder to be used on the recording medium 4, converts the data to analog voice signals and then feeds the signals to the amplifier 5. Consequently the voice data is read from the folder to be used in the mode immediately before the turning off of the power source, and the speaker 6 outputs the voice data as voice.

For example, when the mode immediately before the power source of the apparatus main body is turned off is the folder 1 mode, and if a recording medium having voice data recorded in folder 1 is set in the apparatus, the voice data recorded in folder 1 is output from the speaker 6.

The holder to be used in the mode immediately before the power source of the apparatus main body is turned off has high possibility of being the folder intended to be used for reproduction, and if the voice data the reproduction of which is started as stated above is the voice data recorded in the folder intended by the user, the user need not perform a mode changing procedure subsequently.

The preferential reading procedure thus realized simplifies the procedure to be performed by the user for reproducing the voice data recorded in the desired folder.

On the other hand, when recognizing that no voice data is recorded in the folder to be used in the mode at the time when the reproduction key is depressed, the control circuit 70 sends an alarm display signal to the information display 9. As a result, the display 9 shows that no voice data is recorded in the folder to be used, for example, by displaying an alarm, "NO DATA," for 2 seconds. The control circuit 70 thereafter turns off the power source of the apparatus main body.

For example, if the mode immediately before the power source is turned off is the folder 1 mode and when the recording medium set in the apparatus has no voice data recorded in folder 1, the above alarm is shown on the display 9, and the power source of the apparatus main body is thereafter turned off.

In this way, power consumption is reduced by turning off the power source of the apparatus main body in the case where no voice data is recorded in the folder which is very likely to be used by the user for reproduction.

However, in the case where the recording medium set in the conventional voice recording-reproduction apparatus has no voice data recorded in the folder to be used in the mode at the time when the reproduction key is depressed in the preferential reading procedure, and when the user is to check whether voice data is recorded in one of the folders on the medium, it is necessary to repeatedly perform a sequence of manipulations including turning on the power source of the apparatus main body from the off state for a mode change, thereafter turning off the power source and depressing the reproduction key, until voice data is reproduced from the folder to be used in one of the other modes, hence the problem of a cumbersome procedure.

Further in the case where the recording medium set in the conventional voice recording-reproduction apparatus has no voice data recorded in the folder to be used in the mode at the time of depression of the reproduction key, the above-mentioned alarm is displayed regardless of whether voice data is recorded in the folder to be used in other mode, so that the user who uses the apparatus for the first time is likely to erroneously recognize that the recording medium has no voice data recorded thereon even if voice data is recorded in other folder.

SUMMARY OF THE INVENTION

Accordingly, an object of the present invention is to provide a data reproduction circuit which enables the user to check whether data is recorded in one of folders on a recording medium by a simple procedure without the likelihood of erroneously recognizing that a recording medium having data recorded thereon is one having no data recorded thereon, and to provide a voice recording-reproduction apparatus comprising the circuit.

The present invention provides a voice recording-reproduction apparatus which comprises a microphone, a folder preparing circuit for preparing on a recording medium a plurality of folders for recording voice data therein, a voice data recording circuit for selecting one of the folders and recording in the selected folder voice data as to voice input from the microphone, and a voice data reproduction circuit capable of performing a preferential reading operation to read voice data from preselected one of the folders in preference to the other folders. The voice data reproduction circuit is characterized in that the circuit comprises:

memory means for storing therein folder specifying data for specifying the preselected folder, checking means for specifying the preselected folder in response to a manipulation by the user to effect the preferential reading operation, with reference to the folder specifying data stored in the memory means, and checking whether voice data is recorded in the preselected folder, data reproduction means for reading the voice data from the preselected folder and reproducing the voice data when the preselected folder is found to have the voice data recorded therein, auxiliary checking means for checking whether voice data is recorded in one of the other folders when the preselected folder is found to have no voice data recorded therein, and auxiliary data reproduction means for reading the voice data from one of the other folders and reproducing the voice data when one of the other folders is found to have the voice data recorded therein.

With the voice recording-reproduction apparatus of the invention, a plurality of folders are prepared on the recording medium.

When the user manipulates the apparatus to select one of the folders prepared on the recording medium and thereafter manipulates the apparatus to start recording, voice data as to the voice input from the microphone is written to the folder selected by the user.

Accordingly, the folders prepared on the recording medium include one having the voice data recorded therein and those having no voice data recorded therein.

When the user sets the recording medium in the apparatus and then manipulates the apparatus to effect the preferential reading operation, and if voice data is recorded in a preselected folder, the voice data is read from the folder and reproduced. In the case where the preselected folder has no voice data recorded therein, on the other hand, the other folders are automatically checked as to whether voice data is recorded in one of the folders, and if one of the folders is found to have the voice data, the voice data is read from the folder and reproduced. This enables the user to recognize that the recording medium set in the apparatus is a voice data-recording medium.

The voice recording-reproduction apparatus of the invention is further so adapted that even when no voice data is recorded in the preselected folder but if one of the other folders has voice data recorded therein, the voice data is read from the folder and reproduced. Accordingly, the user using the apparatus for the first time is unlikely to erroneously recognize that a recording medium having voice data recorded in one of the folders other than the preselected one is a medium having no voice data recorded therein although the conventional apparatus has this drawback.

Stated more specifically, the voice recording-reproduction apparatus comprises:

a manual key to be manipulated for reproducing voice data, first power supply means for holding the voice data reproduction means, the auxiliary checking means and the auxiliary voice data reproduction means of the voice data reproduction circuit in an operable condition, with a power source of a main body of the apparatus turned on, and second power supply means for holding the memory means and the checking means of the voice data reproduction circuit in an operable condition at all times, the checking means of the voice data reproduction circuit being operable to turn on the power source of the apparatus main body and perform the checking operation when the manual key is manipulated, with the power source of the apparatus main body held off.

With the apparatus having the specific construction described, the user manipulates the manual key with the power source of the apparatus main body turned off, whereupon the power source of the apparatus main body is turned on, bring the voice data reproduction means, the auxiliary checking means and the auxiliary voice data reproduction means into an operable condition. In the case where voice data is recorded in one of the folders prepared on the recording medium, the voice data is read from the folder and reproduced.

This enables the user to check whether voice data is recorded in one of the folders on the recording medium merely by manipulating the manual key, hence a very easy procedure.

Specifically stated, the apparatus comprises a data display, and display control means for showing on the data display that one of the folders has no voice data recorded therein when the folder is so found.

The display enables the user to recognize that the recording medium set in the apparatus is one containing no voice data. The user therefore feels at ease.

Further stated specifically, the apparatus comprises means for turning off the power source of the apparatus main body after the displaying operation by the display control means.

This construction leads to reduced power consumption by turning off the power source of the apparatus main body when no voice data is recorded in any of the folders on the recording medium.

The voice recording-reproduction apparatus embodying the invention enables the user to check whether voice data is recorded in one of the folders on the recording medium by manipulating the apparatus only once to effect the preferential reading operation as described above, hence a simple procedure unlike the conventional voice recording-reproduction apparatus which requires repetition of a sequence of manipulations for checking every folder as to whether voice data is recorded in the folder.

With the apparatus of the invention, the user is unlikely to erroneously recognize the recording medium containing voice data as a recording medium having no voice data recorded therein.

DETAILED DESCRIPTION OF THE PREFERRED EMBODIMENT

With reference to the drawings, a detailed description will be given below of a voice recording-reproduction apparatus embodying the present invention.

Figure 1:
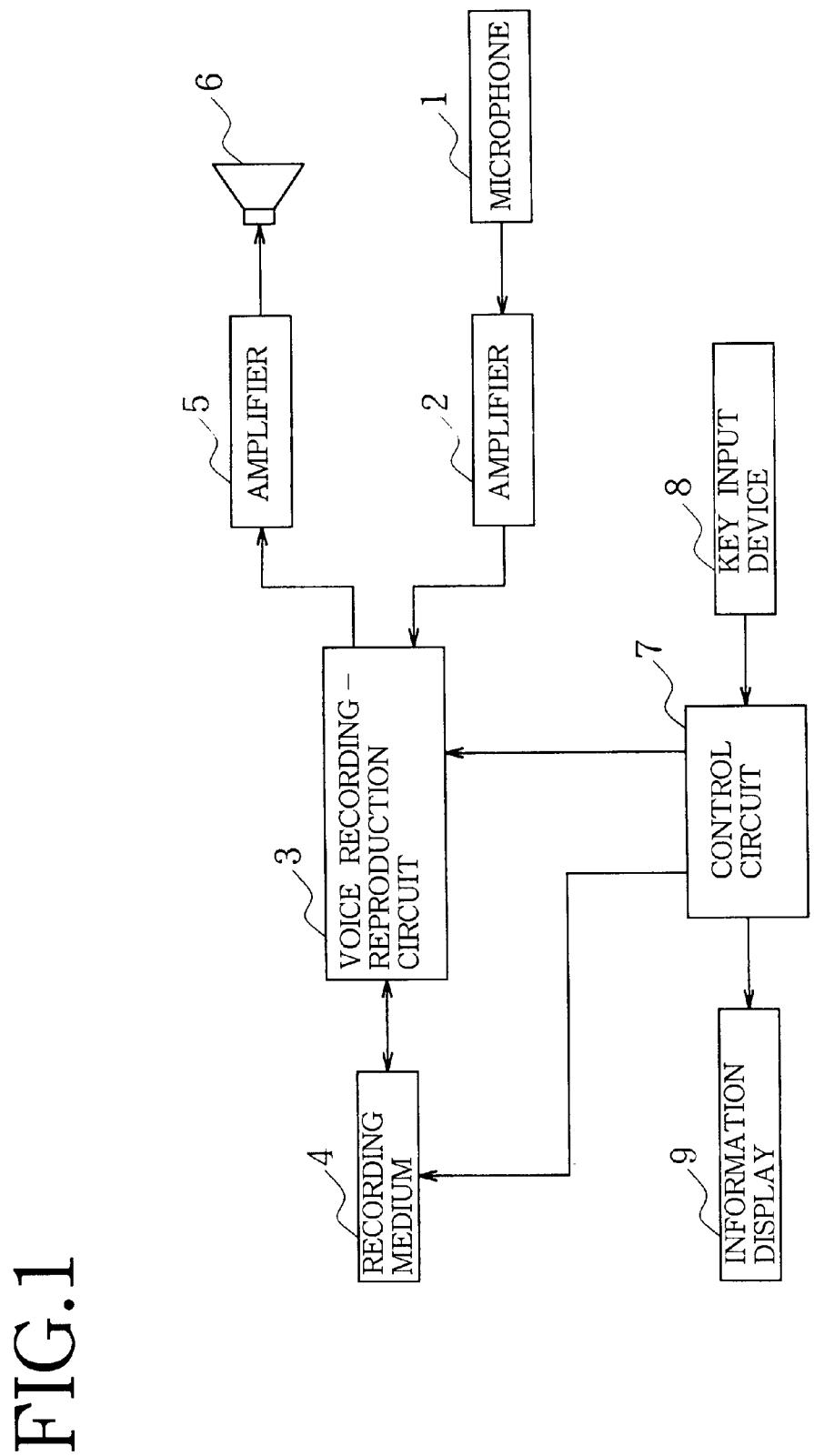
FIG. 1 is a block diagram showing the construction of a voice recording-reproduction apparatus of the invention.

FIG. 1 shows the construction of the voice recording-reproduction apparatus.

The apparatus has a microphone 1 and a speaker 6 which are connected to a voice recording-reproduction circuit 3 via respective amplifiers 2, 5. Also connected to the circuit 3 is a recording medium 4 for recording voice signals input from the microphone 1 in the form of digital voice data.

The series of voice signals input from the microphone 1 is fed to and amplified by the amplifier 2, and then fed to the circuit 3, in which the signals are converted to digital voice data. The voice data is written to the medium 4.

On the other hand, the voice data recorded on the recording medium 4 is read by the circuit 3 and converted to analog voice signals, which are fed to and amplified by the amplifier 5 and thereafter delivered from the speaker 6 as voice.

Connected to the voice recording-reproduction circuit 3 is a control circuit 7 for controlling the operation of the circuit 3. The control circuit 7 has incorporated therein a memory (not shown) for storing mode specifying data for specifying the mode of the circuit 3 to be described later. Power is supplied to the circuit 7 at all times regardless of whether the power source of the apparatus main body is on or off.

A key input device 8 and an information display 9 are further connected to the control circuit 7.

The voice recording-reproduction circuit 3 of the present embodiment is adapted to prepare four folders, e.g., folder 1, folder 2, folder 3 and folder 4, on the recording medium 4. The circuit 3 is selectively settable by a change-over in one of four modes, i.e., folder 1 mode wherein data is written to and read from folder 1, folder 2 mode wherein data is written to and read from folder 2, folder 3 mode wherein data is written to and read from folder 3, and folder 4 mode wherein data is written to and read from folder 4.

To operate the voice recording-reproduction apparatus, the user turns on the power source of the apparatus main body, then sets an unused new recording medium 4 in the apparatus main body, and thereafter manipulates a mode select key (not shown) on the key input device 8 to select the folder 1 mode, whereupon the control circuit 7 sets the voice recording-reproduction circuit 3 in the folder 1 mode, writes mode specifying data representing the folder 1 mode to the memory in the circuit 7 and thereafter gives a folder preparation command to the circuit 3. In response to the command, the circuit 3 prepares folder 1 on the medium 4. Similarly when the user selects the folder 2 mode, folder 3 mode and folder 4 mode, the circuit 3 prepares folder 2, folder 3 and folder 4 on the medium 4, respectively.

Subsequently when the user is to record a sequence of voice data, for example, in folder 1, the user selects the folder 1 mode by manipulating the mode select key on the key input device 8 and then depresses a recording start key (not shown) on the key input device 8. When this procedure is performed, the control circuit 7 sets the voice recording-reproduction circuit 3 in the folder 1 mode, rewrites the mode specifying data in the memory in the circuit 7 to mode specifying data representing the folder 1 mode, and thereafter gives a recording command to the circuit 3. In response to the command, the circuit 3 converts the voice signals delivered from the amplifier 2 to digital voice data and thereafter records the data in folder 1 on the recording medium 4.

In this way, the user can record the series of voice signals input from the microphone 1 in the desired folder among folders 1 to 4 as digital voice data.

The voice recording-reproduction apparatus is further adapted to perform a preferential reading procedure. When the user depresses a reproduction key (not shown) with the power source of the apparatus main body turned off, the control circuit 7 turns on the power source of the main body of the voice recording-reproduction apparatus, thereafter recognizes the mode of the voice recording-reproduction circuit 3 currently set, namely, the mode set immediately before the power source is turned off, with reference to the mode specifying data written to the circuit memory and checks whether voice data is recorded in the folder to be used in this mode. When the check result indicates the presence of voice data, the control circuit 7 gives a reproduction command to the circuit 3. In response to the command, the circuit 3 reads the voice data from the folder to be used on the recording medium 4, converts the data to analog voice signals and then feeds the signals to the amplifier 5. Consequently the voice data is read from the folder to be used in the mode immediately before the turning off of the power source, and the speaker 6 outputs the voice data as voice.

For example, when the mode immediately before the power source of the apparatus main body is turned off is the folder 1 mode, and if a recording medium having voice data recorded in folder 1 is set in the apparatus, the voice data recorded in folder 1 is output from the speaker 6.

On the other hand, when the control circuit 7 recognizes that no voice data is recorded in the folder to be used in the mode at the time of depression of the reproduction key, the circuit 7 checks all the folders other than the folder in a predetermined order to determine which of the folders has voice data recorded therein. For example, in the case where the mode set at the time of depression of the reproduction key is the folder 1 mode, the order is folder 2→folder 3→folder 4. When the set mode is the folder 2 mode, the order is folder 3→folder 4→folder 1. When the set mode is the folder 3 mode, the order is folder 4→folder 1→folder 2. When the set mode is the folder 4 mode, the order is folder 1→folder 2→folder 3.

When recognizing the presence of voice data in one of the folders, the control circuit 7 sets by a change-over the voice recording-reproduction circuit 3 in the mode in which this folder is to be used for writing and reading, rewrites the mode specifying data stored in the memory of the circuit 7 to mode specifying data representing the set mode and thereafter gives a reproduction command to the circuit 3. In response to the command, the circuit 3 reads the voice data from the folder to be used in the set mode, converts the data to analog voice signals and feeds the signals to the amplifier 5. Consequently, the voice data is read from one of the folders other than the folder to be used in the mode at the time when the reproduction key is depressed, and the speaker 6 outputs the voice data as voice.

For example, when the mode immediately before the power source of the apparatus main body is turned off is the folder 1 mode, and if a recording medium having voice data recorded only in folder 3 is set in the apparatus, the voice data recorded in folder 3 is output from the speaker 6 as voice. Further when the recording medium set in the apparatus has voice data recorded in folder 3 and folder 4, the voice data recorded in folder 3 is delivered from the speaker 6 as voice when the presence of the data in folder 3 is recognized.

Further when recognizing that no voice data is recorded in any of the folders other than the folder to be used in the mode at the time when the reproduction key is depressed, the control circuit 7 sends an alarm display signal to the information display 9. As a result, the display 9 shows that no voice data is recorded in any of the folders, for example, by displaying an alarm, "NO DATA," for 2 seconds. The control circuit 7 thereafter turns off the power source of the apparatus main body.

Figure 2:
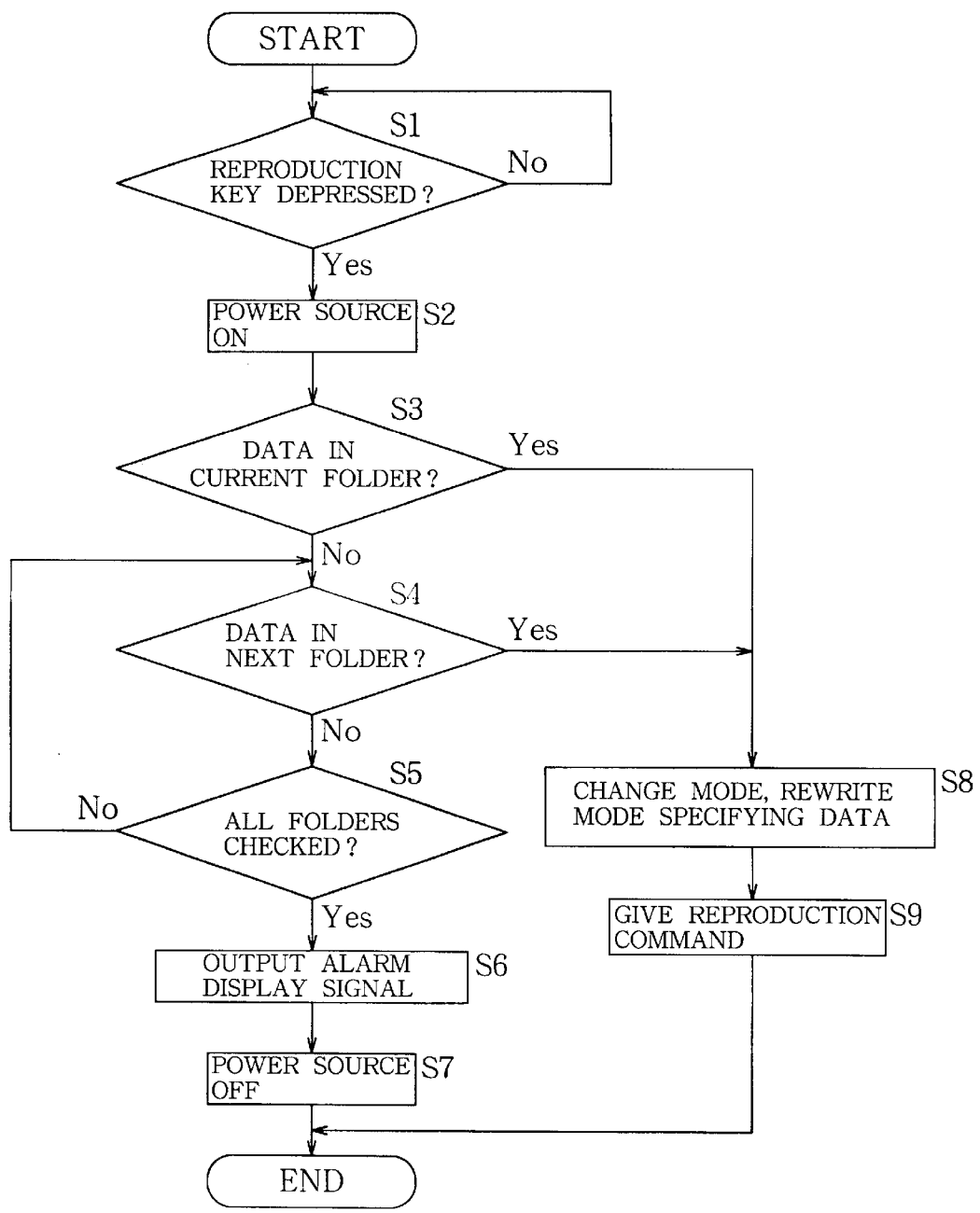
FIG. 2 is a flow chart showing the reproduction control procedure to be performed by a control circuit of the invention.
Figure 3:
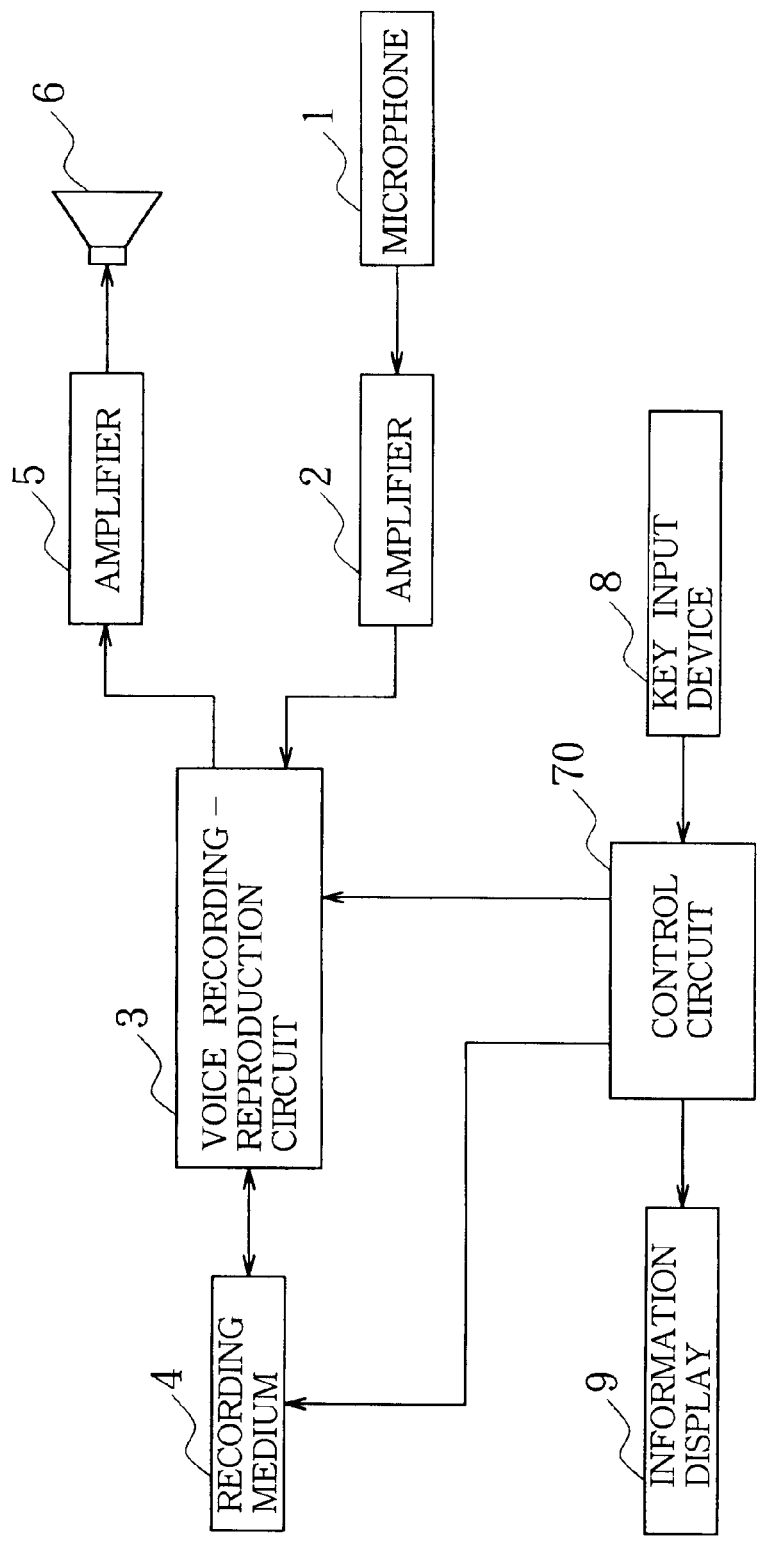
FIG. 3 is a block diagram showing the construction of a conventional voice recording-reproduction apparatus.

FIG. 2 shows the reproduction control procedure to be performed by the control circuit 7. The control circuit 7 performs the following operation, with the power source of the apparatus main body turned off.

First in step S1, an inquiry is made as to whether the reproduction key has been depressed. If the answer is negative, the same inquiry of step S1 is repeated.

On the other hand, when the user depresses the reproduction key with the power source of the apparatus main body turned off, the inquiry of step S1 is answered in the affirmative, followed by step S2 to turn on the power source of the apparatus main body.

Subsequently in step S3, the control circuit 7 recognizes the current mode of the voice recording-reproduction circuit 3, namely, the mode set immediately before the power source is turned off, with reference to the mode specifying data stored in the memory in the circuit 7, and inquires whether voice data is recorded in the folder to be used in the mode. When the answer is affirmative, step S8 follows in which the circuit 7 gives a reproduction command to the circuit 3. Consequently, the voice data is read from the folder to be used in the mode set immediately before the apparatus main body power source is turned off, and the voice data is output from the speaker 6 as voice.

On the other hand, if no voice data is recorded in the folder to be used in the current mode of the voice recording-reproduction circuit 3, the inquiry of step S3 is answered in the negative, followed by step S4, in which an inquiry is made as to whether voice data is recorded in the next folder. When the inquiry is answered in the negative, the sequence proceeds to step S5, in which an inquiry is made as to whether all the folders on the recording medium, i.e., folders 1 to 4, have been checked for the presence of voice data. If the answer is negative, step S4 follows again.

In the case where no voice data is recorded in the folder to be used in the current mode of the circuit 3 but voice data is recorded in one of the folders other than the current folder, the inquiry of step S4 is answered in the affirmative during the repetition of the inquiries of step S4 and step S5, followed by step S8, in which the circuit 3 is set by a change-over in the mode wherein the data-containing folder is to be used, and the mode specifying data in the circuit memory is rewritten to mode specifying data representing the set mode. A reproduction command is thereafter given to the circuit 3 in step S9. Consequently the voice data is read from one of the folders other than the folder to be used in the mode immediately before the power source of the apparatus main body is turned off, and the speaker 6 outputs the voice data as voice.

In the case where no voice data is recorded in any of folders 1 to 4, the inquiries of step S4 and step S5 are repeated, and the inquiry of step S5 is eventually answered in the affirmative. Step S6 then follows to output an alarm display signal to the information display 9. As a result, the alarm of "NO DATA" is shown on the display 9.

The power source of the voice recording-reproduction apparatus is thereafter turned off in step S7 to complete the procedure.

With the voice recording-reproduction apparatus of the present embodiment, all the folders prepared on the recording medium 4 are automatically checked for the presence of voice data in one of the folders merely by the depression of the reproduction key by the user, and when voice data is recorded in one of the folders, the voice data recorded therein is reproduced, while if no voice data is recorded in any of the folders, the above-mentioned alarm is presented on the information display 9. Accordingly, whether voice data is recorded in one of the folders on the recording medium can be checked by a greatly simplified procedure.

Further when no voice data is recorded in the folder to be sued in the mode at the time of depression of the reproduction key, but if one of the folders other than that folder contains voice data, the voice data recorded therein is reproduced, so that even if the user uses the apparatus of the embodiment for the first time, the user is unlikely to erroneously recognize a voice data recording medium as a recording medium having no voice data recorded thereon.

The embodiment described above is intended to illustrate the present invention and should not be construed as limiting the invention set forth in the appended claims or reducing the scope thereof. Furthermore, the apparatus of the invention is not limited to the embodiment in construction but can of course be modified variously without departing from the scope of the invention as set forth in the claims.

For example, the invention is applied to a voice recording-reproduction apparatus according to the foregoing embodiment, whereas the invention is not limited only to this application but can be embodied as video recording-reproduction apparatus for reproducing and recording video data.

What is claimed is:

1. A voice data reproduction circuit to be used for a recording medium having a plurality of folders prepared thereon and capable of performing a preferential reading operation to read voice data from preselected one of the folders in preference to the other folders, the voice data reproduction circuit comprising:

memory means for storing therein folder specifying data for specifying the preselected folder, checking means for specifying the preselected folder in response to a manipulation by the user to effect the preferential reading operation, with reference to the folder specifying data stored in the memory means, and checking whether voice data is recorded in the preselected folder, data reproduction means for reading the voice data from the preselected folder and reproducing the voice data when the preselected folder is found to have the voice data recorded therein, auxiliary checking means for checking whether voice data is recorded in one of the other folders when the preselected folder is found to have no voice data recorded therein, and auxiliary data reproduction means for reading the voice data from one of the other folders and reproducing the voice data when one of the other folders is found to have the voice data recorded therein.

2. A voice recording-reproduction apparatus comprising a microphone, a folder preparing circuit for preparing on a recording medium a plurality of folders for recording voice data therein, a voice data recording circuit for selecting one of the folders and recording in the selected folder voice data as to voice input from the microphone, and a voice data reproduction circuit capable of performing a preferential reading operation to read voice data from preselected one of the folders in preference to the other folders, the voice data reproduction circuit comprising:

memory means for storing therein folder specifying data for specifying the preselected folder, checking means for specifying the preselected folder in response to a manipulation by the user to effect the preferential reading operation, with reference to the folder specifying data stored in the memory means, and checking whether or not voice data is recorded in the preselected folder, data reproduction means for reading the voice data from the preselected folder and reproducing the voice data when the preselected folder is found to have the voice data recorded therein, auxiliary checking means for checking whether or not voice data is recorded in one of the other folders when the preselected folder is found to have no voice data recorded therein, and auxiliary data reproduction means for reading the voice data from one of the other folders and reproducing the voice data when one of the other folders is found to have the voice data recorded therein.

3. A voice recording-reproduction apparatus according to claim 2 further comprising:

a manual key to be manipulated for reproducing voice data, first power supply means for holding the voice data reproduction means, the auxiliary checking means and the auxiliary voice data reproduction means of the voice data reproduction circuit in an operable condition, with a power source of a main body of the apparatus turned on, and second power supply means for holding the memory means and the checking means of the voice data reproduction circuit in an operable condition at all times, the checking means of the voice data reproduction circuit being operable to turn on the power source of the apparatus main body and perform the checking operation when the manual key is manipulated, with the power source of the apparatus main body turned off.

4. A voice recording-reproduction apparatus according to claim 2 further comprising a data display, and display control means for showing on the data display that one of the folders has no voice data recorded therein when the folder is found.

5. A voice recording-reproduction apparatus according to claim 4 further comprising means for turning off the power source of the apparatus main body after the displaying operation by the display control means.

* * * * *